United States Patent [19]
Klein et al.

[11] Patent Number: 4,838,376
[45] Date of Patent: Jun. 13, 1989

[54] POWER STEERING DEVICE FOR PARKING

[75] Inventors: Hans-Christof Klein, Hattersheim; Peter Drott, Frankfurt am Main, both of Fed. Rep. of Germany

[73] Assignee: Alfred Teves GmbH, Frankfurt am Main, Fed. Rep. of Germany

[21] Appl. No.: 57,422

[22] Filed: Jun. 2, 1987

[30] Foreign Application Priority Data

Jun. 2, 1986 [DE] Fed. Rep. of Germany ....... 3618527

[51] Int. Cl.$^4$ ............................................. B62D 5/09
[52] U.S. Cl. .................................... 180/142; 180/143
[58] Field of Search ............... 180/141, 142, 143, 132, 180/79.1; 91/458, 459; 60/404

[56] References Cited

U.S. PATENT DOCUMENTS

| | | | |
|---|---|---|---|
| 1,863,567 | 6/1932 | Fisher | 180/79.1 X |
| 2,356,492 | 8/1944 | Smith | 180/142 |
| 2,925,741 | 2/1960 | Winkelmann | 180/79.1 X |
| 2,930,247 | 3/1960 | Zinn | 180/79.1 X |
| 3,983,953 | 10/1976 | Bayle | 180/79.1 |
| 4,598,787 | 7/1986 | Drutchas | 180/79.1 |
| 4,616,727 | 10/1986 | Kircher et al. | 180/142 |

FOREIGN PATENT DOCUMENTS

| | | | |
|---|---|---|---|
| 563664 | 10/1932 | Fed. Rep. of Germany | 180/79.1 |
| 61-41670 | 2/1986 | Japan | 180/79.1 |
| 409650 | 10/1966 | Switzerland | 180/142 |

*Primary Examiner*—Charles A. Marmor
*Attorney, Agent, or Firm*—James B. Raden

[57] ABSTRACT

A power steering device for parking for automotive vehicles has a left-turn switch (11) and a right-turn switch (12) which are associated with the steering column (13) which, in case of the steering wheel's (14) not being operated, adopt a first position and which, in case of a left or a right turn of the steering wheel (14), adopt a second position and act on associated left and right turning angle valves (17, 18) via an AND-gate (15, 16) associated with each. Upon actuation of the left-turn switch or of the right-turn switch (11, 12) a hydraulic pressure source is connected correspondingly to a hydraulic energy-generating device (34) assisting the steering system and acting on the steering linkage (37). The steering-column (13)-and-steering-wheel (14) arrangement consists of two parts (13, 14) twistable relative to each other in a limited manner upon a turn of the steering wheel (14). A linking element (20) adjustable between two positions permits the two parts (13, 14) to be coupled nonrotatably in the mid-position by means of a positive connection. The speed-AND-gate (21) actuates a coupling relay (22), which acts on the linking element (20) in such a manner as to ensure that, in case of the release switches (19, 23) being actuated, the parts (13, 14) will be uncoupled. The left-turn and right-turn switches (11, 12) are only actuatable when the parts (13, 14) are uncoupled and when there is a relative torsion by an amount lying within the narrowly limited range.

9 Claims, 2 Drawing Sheets

POWER STEERING DEVICE FOR PARKING

BACKGROUND OF THE INVENTION

This invention ralates to a power steering device for parking for automotive vehicles and, more particularly to such a device including a left-turn switch and a right-turn switch associated with the steering column. In case of the steering wheel's being unoperated, the switches can adopt a first position and in case of a left or a right turn of the steerig wheel, can adopt a second position. Each switch is associated with an AND-gate, the other input of which —via a further speed-AND-gate —is connected to a speed-responsive threshold value release switch and a further release switch. This electronic system acts upon an associated left turning angle valve and an associated right turning angle valve, which valves —upon the actuation of the left-turn switch or of the right-turn switch correspondingly connect a hydraulic pressure source to a steering-assisting hydraulic energy-generating device acting upon the steering linkage.

Such a power steering device for parking is switched on only when the vehicle's speed has dropped below a certain speed of, e.g., 5 km/hr and a further switch has been closed by, for instance, switching into the first gear or into the rear gear (German Published Patent Application DE-OS No. 34 10 033 corresponding to U.S. Pat. No. 4,616,727). Thus, when parking, an intensive additional energy source is available for the actuation of the steering system. So the driver has but to generate a small force for the torsion of the steering wheel, especially when being at a standstill.

During normal driving at higher speeds and in higher gears, however, the hydraulic steering aid unit for parking is switched off as now the steering system can be operated more easily as the driver has a better feeling for the steering behavior of his vehicle without hydraulic boosting of the steering force.

A problem in the known power steering device is that it is impossible to use normal switches with moving switch contacts as the strains ensuing during the torsion of the steering column are too small. Thus, for instance, it must be operated with wire strain gauges which must be connected up with a complicated and expensive electronic system. A further disadvantage is that the respective left-turn and right-turn switches are operated during any movement of the steering wheel even during normal driving.

SUMMARY OF THE INVENTION

It is an object of this invention to provide a power steering device for parking of the type referred to above where, during normal driving, the hydraulic steering aid unit is switched off, the left-turn and right-turn switches remain unoperated during normal steering turns and where, conventional switches with usual contact travels can be used.

To accomplish these objects this invention provides that the steering-column-and-steering-wheel arrangement comprises two parts twistable relative to each other within narrow limits around a mid-position upon a turn of the steering wheel; that a linking element adjustable between two positions allows the two parts to be nonrotatably coupled in the mid-position by means of a frictional connection, preferably by means of a positive connection; that the speed-AND-gate actuates a coupling relay, which acts on the linking element, so as to ensure that, in case of the release switches being actuated, the parts will be uncoupled; and that the left-turn and right-turn switches are actuatable only with the parts uncoupled and in case of a relative torsion by an amount lying within the narrowly limited range. In this arrangement, the steering column and the steering wheel preferably are the two parts twistable relative to each other within narrow limits. The parts twistable relative to each other in a limited manner can also be effected at a wider distance off the steering wheel, and this —advantageously —near the steering gear.

Preferably between the steering wheel and the steering column there is provided a small free rotational motion which can be undone by a linking element in the mid-position of the parts twistable relative to each other. In this way, the steering wheel and the steering column are coupled with each other in an absolutely nonrotatable manner during normal driving while, for the purpose of parking, on either side of the mid-position there is a small play available within the limits of which the left-turn and right-turn switches are actuated upon a corresponding turn of the steerig wheel. In this way, on the one hand, there are reliably working switching mechanics which are actuated by the relative movement of the steering wheel and steering column while, on the other hand, care has been taken with regard to ensuring that the left-turn and right-turn switches remain unoperated during normal driving and, particularly, during steering turns to the right or to the left.

The play existing between the steering wheel and the steering column in the uncoupled condition, on the one hand, must be big enough to actuate the left-turn and right-turn switches. On the other hand, it is to remain small enough so as to not disturb during driving at low speeds. Because of this play, however, it is indicated to effect switching-off of the hydraulic power steering device as early as at speeds as low as possible such as at speeds exceeding 5 km/hr. The play existing in the uncoupled condition expediently is to be rated big enough so as to allow the use of normal electric switches with usual contact travels and to ensure the avoidance of wire strain gauges.

In an advantageous practical realization of the inventions, the steering wheel has a ring rotatably mounted on the steering column and carrying a locking pin radially displaceable by the coupling relay. This locking pin forms the linking element and extends with a conical portion between two stops of the steering column such as to permit the narrowly limited relative movement between the two parts when the coupling relay is acted on. When the coupling relay is not acted on, the conical portion abuts firmly on the two stops aand prevents the limited relative movement. In this arrangement a spring prestresses the locking pin into the locking position that prevents the relative movement.

Normally, i.e., when the coupling relay is switched off, the steering column and the steering wheel are nonrotatably coupled with each other and uncoupling will take place only when the coupling relay is electrically energized.

According to a further advantageous embodiment it is provided that, in the mid-position, the left-hand and right-hand actuating elements of the left-turn and right-turn switches are spaced a small distance from the associated actuation stops.

In this embodiment, during normal driving the actuating elements of the left-turn and right-turn switches likewise are not in contact with the stops acting upon them in case of parking so that the switches inclusive of their actuating elements are in an absolute rest position during normal driving.

In the known power steering device (German Published Patent Application - DE-OS No. 34 10 033; U.S. Pat. No. 4,616,727) the further release switch is operated by switching into first gear or into reverse gear. According to this invention, the further release switch is a hand-operated ON OFF switch provided on the steering wheel. In this way, the driver can switch off the hydraulic steering aid unit when first or reverse gear in engaged. The is expedient not only because of a better feeling for the steering behavior of the vehicle even at lower speeds but also because of the elimination of the slight play between the steering wheel and the steering column. The hand-operated switching-off of the hydraulic steering aid unit is also to be protected irrespective of the provision of a free rotational motion between the steering wheel and the steering column.

It is further advantageous to provide that the two parts of the steering-column-and-steering-wheel arrangement which are twistable relative to each other within narrow limits are twistable relative to each other around the steering column axis.

To ensure that, in the uncoupled condition, the parts movable relative to each other in a limited manner adopt a defined mid-position with the steering wheel not being operated, a further embodiment of this invention provides that, in the uncoupled condition, the two parts, which are twistable relative to each other in a limited manner, are prestressed towards a mid-position by means of a spring arrangement effective between them. The force of the spring arrangement is sufficiently strong so as to bring the two parts into the mid-position relative to each other when the steering wheel is released, but it is less than the steering resistance of the wheels and of the steering gear so as to ensure that, upon the actuation of the steering wheel, the spring arrangement is compressed so that, the locking pin can abut on either of the stops, thus respectively the left-turn and right-turn switches being actuated which have a finite contact travel. A practical embodiment is characterized in that a spring abutment is arranged in the center of the radially inside front face of the locking pin. Tension springs extend from the locking pin to either side to spring abutments arranged on the stops. These springs are thus under a prestress in the mid-position of the parts twistable relative to each other in a limited manner.

BRIEF DESCRIPTION OF THE DRAWING

This invention will be described by way of example in the following description of a preferred embodiment with reference being made to the drawing in which.

DETAILED DESCRIPTION OF A PREFERRED EMDODIMENT

Figure 1:
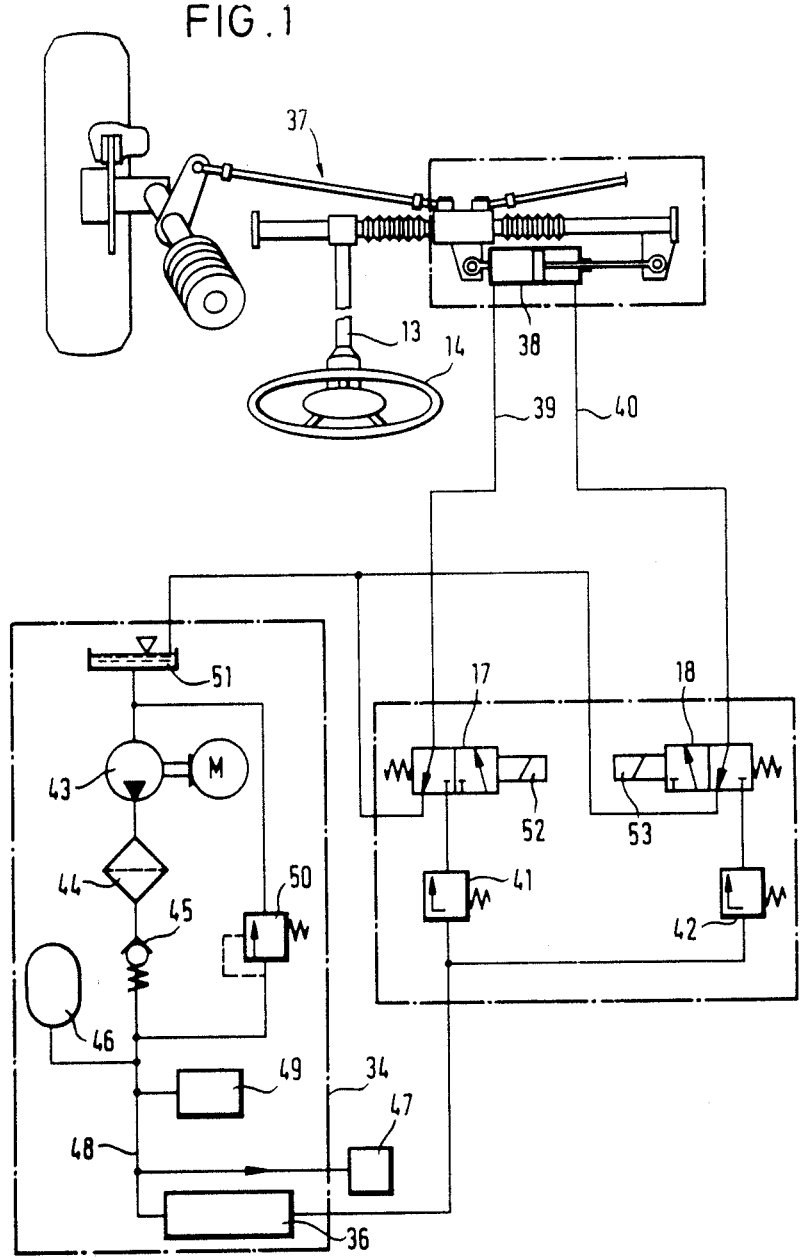
FIG. 1 is a schematical representation of the hydraulic and mechanical parts of a power steering device for parking.

According to FIG. 1, the normal steering linkage 37 of an automotive vehicle can be actuated mechanically by means of the steering wheel 14 via the steering column 13. Providedd at the steering linkage 37 is a dual-action hydraulic piston-and-cylinder arrangement 38 having two pressure chambers connected to two hydraulic lines 39 and 40. Depending on whether or not a pressure is applied to the hydraulic line 39 or 40, there will be a boosting with regard to the steering force exerted by the steering wheel in one steering direction or the other.

The hydraulic lines 39, 40 are connected to two 3/2-way valves 17 and 18, respectively, which, are connected via pressure imiting valves 41, 42, respectively, to a hydraulic energy-generating device designated generally at 34. The hydraulic energy-generating device 34 has a motor-operated pump 43 which, via a filter 44 and a non-return valve 45 and a pressure line 48, is connected to a hydropneumatic accumulator 46 and to the hydraulic brake system 47 of the vehicle. Connected to the pressure line 48 is also a pressure alarm switch 49.

A pressure limiting valve 50 controlled by the input pressure connects the pressure line 48 with the input of the pump 43, which input is also connected to the return reservoir 51.

In the position illustrated in FIG. 1, both the left turning angle valve 17 and the right turning angle valve 18 connect the two pressure chambers of the piston-and-cylinder arrangement 38 with the return reservoir 51 so that the steering system can be operated mechanically without any hindrance or any boosting by the hydraulics.

When either the left turning angle valve 17 or the right turning angle valve 18 is operated in its other position and at the same time the disconnecting switch 36, which is connected between the pressure line 48 and the pressure limiting valves 41, 42, is opened, either the left or the right pressure chamber of the piston-and-cylinder arrangement 38 is acted upon by the pressure in the pressure line 48 so that a corresponding boosting of the steering action will take place upon a turn to the left as well as upon a turn to the right.

The left and right turning angle valves 17 and 18 each are acted upon by solenoids 52, 53 which are actuated in the manner described in the following, reference being made to FIG. 2.

According thereto, the solenoids 52, 53 each are connected to the output of respectively a left-AND-gate 15 and a right-AND-gate 16. One of the inputs of the left-AND-gate 15 and of the right-AND-gate 16 is connected to the output of a further speed-AND-gate 21 one of the inputs of which is connected with a threshold value release switch 19 and the other input of which is connected with an ON/OFF release switch 23 arranged in the area of the steering wheel 14 and to the operated by hand. The threshold value release switch 19 is actuated by a vehicle speed indicator 54 and will be closed only if the vehicle speed indicator 54 registers a speed lying below a predetermined low speed of, e.g., 2 to 5 km/hr.

The other input of the left-AND-gate 15 and of the right-AND-gate 16 is connected with a left-turn switch 11 and a right-turn switch 12, respectively, mounted on the steering column 13 near the steering wheel 14. Fastened to the moving contacts of the left-turn switch 11 and of the right-turn switch 12 are mechanical left-hand and right-hand actuating elements 29 and 30, respectively, extending toward the left-hand and right-hand actuation stops 32, 33. The actuating elements 29 and 30 are spaced from the actuation stops 32 and 33 by a distance 31. The stops 32 and 33 are carried on a ring 24 connected with the steering wheel 14 in a nonrotatable manner and the ring 24 is supported on the steering column 13 so as to be rotatable around the steering column axis 35.

To limit the relative rotation between the steering column 13 and the steering wheel 14, a left-hand stop 26 and a right-hand stop 27 are fastened to the steering column and are spaced apart by a small circumferential distance. Between the stops, at a small distance on either side, there extends a conical pointed portion 25 of a radially displaceable locking pin 20 forming a linking element. The locking pin 20 is arranged radially displaceably with a sliding fit within a radial bore 55. A helical compression spring 28 provided radially outside the ring 24 prestresses the locking pin 20 radially inside and a coupling relay 22 arranged radially outside the ring 24, when energized, displaces the locking pin 20 radially outside into the position shown in FIG. 2. When the relay 22 is de-energized, the locking pin 20, under the influence of the compression spring 28, radially moves inside until it firmly abuts the left-hand stop 26 and the right-hand stop 27. The bevel of the conical portion 25 and of the complementary countersurfaces provided on the left-hand stop 26 and on the right-hand stop 27 are such as to ensure that, upon a turn of the steering wheel, the required mechanical steering forces are transmitted to the steering column 13 without a possibility of the locking pin 20 being radially displaced via the bevelled surfaces.

Fastened on the front face of the conical portion 25 of the locking pin 20 is a central spring abutment 61. Tension springs 55, 56 extend essentially in a tangential direction from both sides of the abutment to the spring abutments 57, 58 projecting radially inwards from the stops 26, 27. The tension springs 55, 56 are fastened to the spring abutments 57, 58 so that, in the mid-position shown in FIG. 2, ther is such a prestress as to ensure that the mid-position is automatically adopted when the steering wheel 14 is not actuated in the uncoupled position. Upon a turn of the steering wheel 14 to the left or to the right, however, the prestressing force of the tension springs 55, 56 will be overcome so that the conical pointed portion 25 can come into contact with the stop 26 or 27, respectively. The tension springs 55, 56 are arranged such as to ensure that they will not prevent the locking pin 20 from darting forward due to the action of the helical compression spring 28.

The mode of operation of the described power steering device for parking is as follows.

During normal driving at higher speeds, the ON/OFF release switch 23 and the threshold value release switch 19 are open so that there is a O-signal at the output of the speed-AND-gate 21 and thus the hydraulic disconnecting switch 36 is closed and the coupling relay 22 is de-energized. The locking pin 20, therefore, due to the action of the spring 28, will be in its radially inside position, abutting the left-hand stop 26 and the right-hand stop 27.

The left turning angle valve 17 and the right turning angle valve 18 are in their positions shown in FIG. 1, as neither the left-AND-gate 15 nor the right-AND-gate 16 emit a signal energizing the solenoids 52, 53.

However, if now the vehicle's speed drops below a minimum speed of, e.g., 3 km/hr set in the threshold value release switch 19 and if, further, the ON/OFF switch 23 is actuated by the driver, there will appear a 1-signal at the output of the speed-AND-gate 21 which signal will energize the coupling relay 22 so that the locking pin 20 will be displaced radially outside into the position shown in FIG. 2. Moreover, there will be a 1-signal at the left input of the AND-gates 15 and 16.

As the steering wheel 14 is turned to the left or to the right, there is a relative torsion between the steering column 13 and the steering wheel 14 within a limited range due to the rotatable arrangement of the ring 24 on the steering column 13. Upon a turn to the left the conical portion 25 moves towards the left-hand stop 26 until it will finally come to contact the same. In doing so, the left-hand actuation stop 32 will come into mechanical engagement with the left-hand actuating element 29, thereby closing the left-turn switch 11. Now there will also be a 1-signal at the right input of the left-AND-gate 15 causing it to output a 1-signal to energize the relay 52 and cause the left turning angle valve 17 to open. Thereupon, a hydraulic pressure will be applied to the hydraulic line 39 and the left steering turn will be assisted hydraulically.

Figure 2:
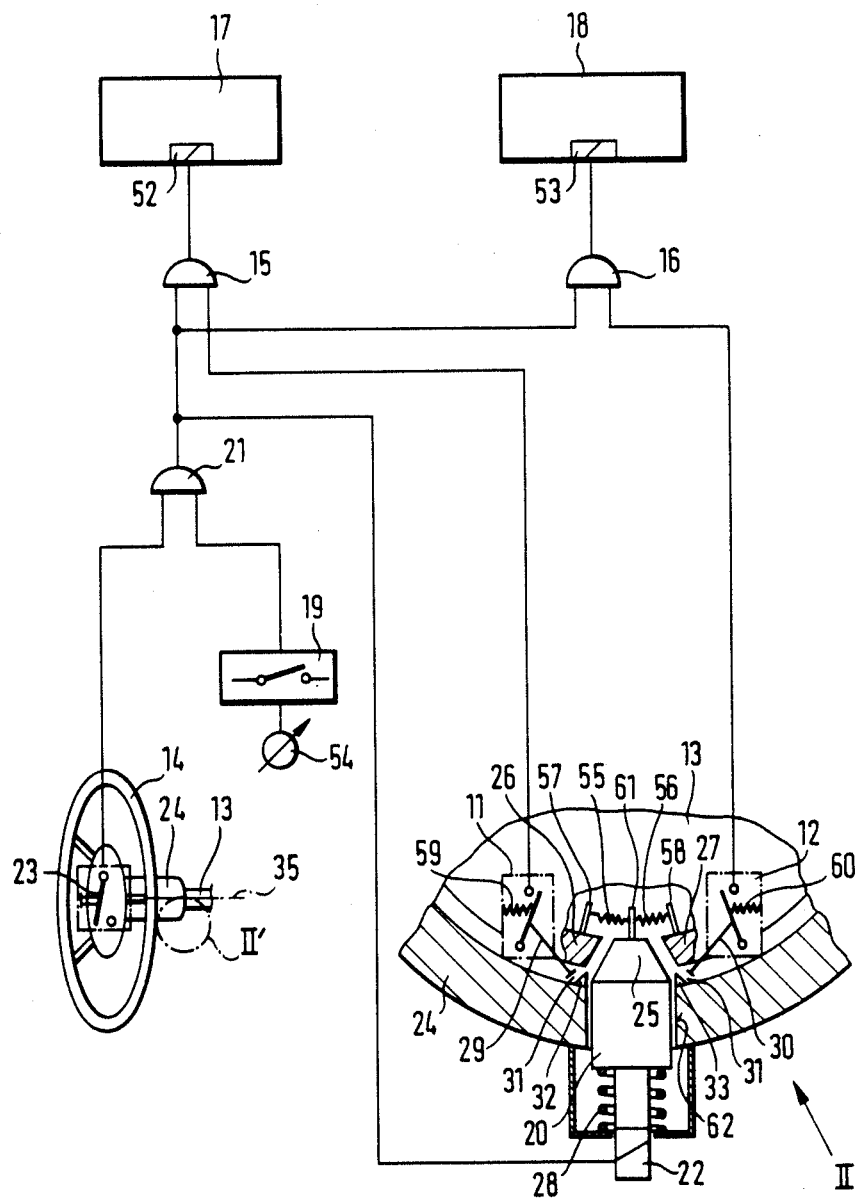
FIG. 2 shows the control part of the same power steering device for parking, the reference numeral II marking an enlarged section through the steering column in the area II.

When the steering turn is terminated, that spring 55 or 56 which has been stressed more strongly will return the steering wheel into the mid-position evident from FIG. 2 at 11. The springs 55, 56 are, of course, provided for the exact defining of the mid-position.

At this time spring 59 will return the left-turn switch 11 to its open position. Thus a 0-signal will appear at the right hand input of left-AND-gate 51 and, in turn, at the output of this AND-gate. The solenoid 52 will be de-energized and the left turning angle valve 17 will be cuased by a spring force to return to the rest position shown in FIG. 1. The left-turn switch 11 and also the right-turn switch 12 thus represent push buttons closing upon the exertion of a switching force and remaining closed only if the switching force continues to last. As soon as the switching force disappears the switches will automatically open again due to the action of the return springs 59, 60.

When the steering wheel is turned to the right, the conical portion 25 will abut on the right-hand stop 27 after overcoming the play. In doing so, the right-hand actuation stop 33 will act on the right-hand actuating element 30 and thus close the right-turn switch 12. A 1-signal will appear at the right hand input of the right-AND-gate 16 and, thus, at its output which signal will energize the solenoid 53 and open the right turning angle valve 18 so that the hydraulic line 40 will be connected to the hydraulic pressure. Now there will be a hydraulic boosting of the right turn of the steering wheel 14. When the turn of the steering wheel 14 is terminated, the steering column wil return into the mid-position shown in FIG. 2 due to the resetting action of the tension spring 55. The return spring 60 will now push the right-turn switch 12 again into its open position so that the valve 18 will close in a manner similar to that described above with respect to valve 17. It can be seen that the right-turn switch 12 is designed as a push button.

The hydraulic disconnecting switch 36 illustrated in FIG. 1 is a safety element provided for in case a drop in the hydraulic pressure is registered at the pressure alarm switch 49. In such a case, the hydraulic disconnecting switch 36 will cut off the described hydraulic power device for parking from the hyraulic energy-generating device so that the still existing hydraulic pressure completely will be at disposal for the application of the hydraulic brake system 47 where for safety reasons it will be needed rather more than for facilitating the steering operation during parking.

The hydraulic disconnecting switch 36 is thus a priority switch which is open during normal operation of the hydraulic energy-generating device 34.

What is claimed is:

1. A power steering device operative during the parking of an automotive vehicle having a steering wheel and an associated steering column, said device comprising a left-turn switch and a right-turn switch associated with the steering column, each of said switches having a first position and a second position, an electrically operated left turning valve and an electrically operated right turning valve which are connected by hydraulic lines to a hydraulic steering system, associated electronic logic means operating in connection with said switches and said valves for opening one of said valves when one of said switches is on its second position and for closing said valves when both of said switches are in their first positions, two parts arranged for rotation relative to each other within narrow limits from a mid-position upon a turn of the steering wheel, a linking element operatively connected to one of said parts comprising a radially displaceable locking pin that is movable between a first position where said two parts are nonrotatably coupled in mid-position by a positive connection and a second position wherein said two parts are rotatable within said narrow limits, a coupling relay associated with said linking element that radially displaces said linking element for moving said linking element to its second position, said electronic logic means including a speed-AND-gate for energizing said coupling relay, one of said switches being moved to their second position when said linking element is in its second position and when one of said two parts is moved to one of its limits.

2. A device as claimed in claim 1 wherein two said parts rotatable relative to each other within narrow limits comprise a steering column and a steering wheel.

3. A device as claimed in claim 2 wherein the steering wheel has a ring rotatably mounted on the steering column and carrys a locking pin radially displaceable by the coupling relay, said locking pin comprising the linking element and extending with a conical portion between two stops on the steering column such as to permit the narrowly limited relative movement between thhe two parts when the coupling relay is acted upon and to firmly abut on the two stops when the coupling relay is not energized.

4. A device as claimed in claim 3 wherein a spring prestresses the locking pin into the locking position.

5. A device as claimed in claim 1 in which left-hand and right-hand activating elements are fastened to left-turn and right-turn switches, respectively, and also with left-hand and right-hand actuation stops, respectively, said actuating elements and said actuation stops being spaced from said actuation stops in said mid-position, said left-turn and right-turn switches being connected to a left-AND-gate and a right-AND-gate, respectively, by said associated electronic logic means and actuating a hydraulic pressure source to act upon said steering wheel and said steering column.

6. A device as claimed in claim 1 further including a hand-operated ON/OFF release switch provided on the steering wheel.

7. A device as claimed in claim 2 wherein the steering column and the steering wheel are twistable relative to each other around the steering column axis.

8. A device as claimed in claim 1 wherein in an uncoupled condition, said steering column and steering wheel are prestressed towards a mid-position by means of tension springs the force of said tension springs causing said steering wheel and said steering column to remain in mid-position when the steering wheel is released, said force being less than the steering resistance of the wheels and of the steering gear so that upon actuation of the steering wheel the tension springs are compressed.

9. A device as claimed in claim 3 wherein a spring abutment is arranged in a center of a radially inside front face of the locking pin, springs extending to either side of said spring abutment toward spring abutments arranged on the stops said springs being under a prestress in the mid-position of said parts rotatable relative to each other in a limited manner.

* * * * *